United States Patent [19]

Schopf

[11] 4,223,758
[45] Sep. 23, 1980

[54] LOADER, ESPECIALLY BUCKET LOADER FOR UNDERGROUND MINING

[75] Inventor: Jörg Schopf, Stuttgart, Fed. Rep. of Germany

[73] Assignee: Schopf Maschinebau GmbH, Stuttgart, Fed. Rep. of Germany

[21] Appl. No.: 902,079

[22] Filed: May 2, 1978

[30] Foreign Application Priority Data

Jun. 9, 1978 [DE] Fed. Rep. of Germany ....... 2815019

[51] Int. Cl.² ............................................. B60K 9/00
[52] U.S. Cl. ................................... 180/291; 180/311; 248/671
[58] Field of Search ............... 180/64 M, 64 MM, 62, 180/58, 69 R, 69.1, 69 C, 89.13, 77 M, 77 TC, 64 R, 55, 54 F, 54 D; 248/671, 672; 105/26 R, 62 R, 61, 140, 456; 296/35 A, 35 B, 190

[56] References Cited

U.S. PATENT DOCUMENTS

| | | | |
|---|---|---|---|
| 2,549,191 | 4/1951 | Gregoire | 180/64 R X |
| 3,806,149 | 4/1974 | Huszar | 180/64 R |
| 3,815,701 | 6/1974 | Mayhew | 180/69 C |
| 3,826,388 | 7/1974 | Oldenburg | 414/697 |
| 3,866,781 | 2/1975 | Stedman et al. | 180/54 F X |
| 3,885,643 | 5/1975 | Goodbary | 296/190 X |
| 4,018,473 | 4/1977 | Chalupsky | 296/190 |

*Primary Examiner*—John J. Love
*Assistant Examiner*—D. W. Underwood

[57] ABSTRACT

A loader, especially a bucket loader for underground use in mining operations, comprising a rear car carrying the propulsion unit including the hydraulic pump and the driver's station, and a front car coupled to the rear car by a hinge joint and carrying the bucket and the hydraulic system for operating same. The rear car is formed by a chassis stiffly joined to the rear axle, which chassis has a stiff bulkhead serving for the mounting of the motor and transmission assembly. The motor and transmission assembly is disposed on a secondary frame which has also a bulkhead that can be fastened to the bulkhead of the chassis, from which on both sides of the motor and transmission assembly longitudinal girders project, between which the motor and transmission group is mounted.

12 Claims, 5 Drawing Figures

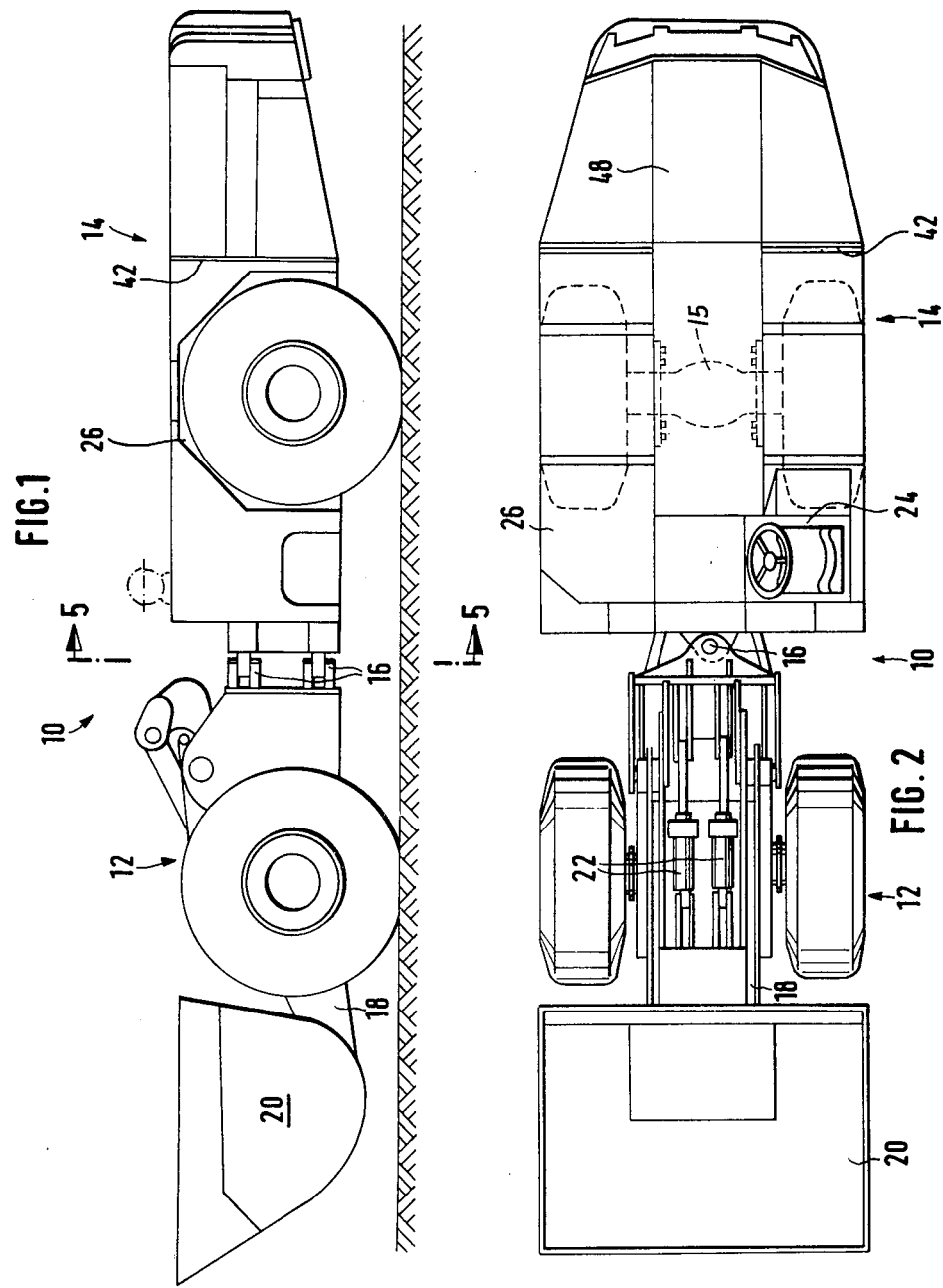

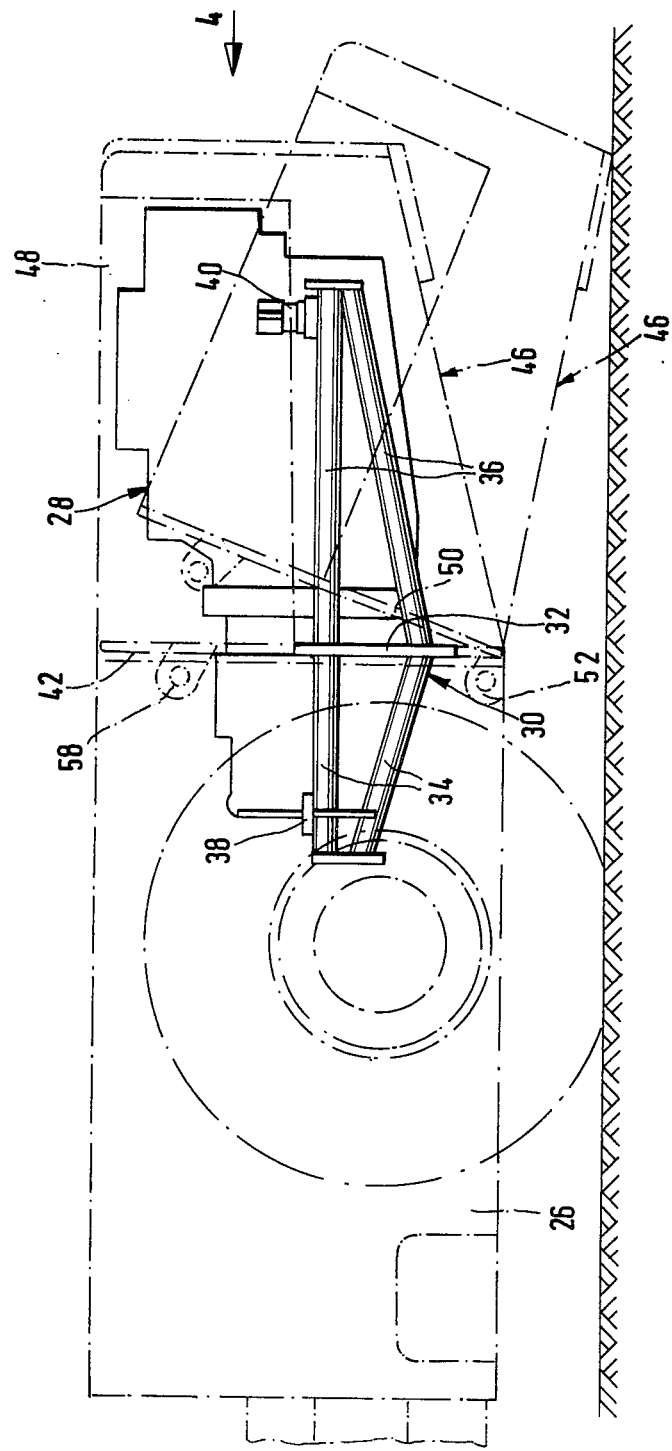

LOADER, ESPECIALLY BUCKET LOADER FOR UNDERGROUND MINING

BACKGROUND

The invention relates to a loader, especially a bucket loader for underground use in mining, consisting of a rear car carrying the drive unit including the hydraulic pump unit and the driver's station, and of a front car connected to the rear car by a hinge coupling and carrying the bucket and the hydraulic system for operating it.

Such bucket loaders, which are steered by pivoting the front car in relation to the rear car, have become increasingly popular in recent years; special loaders of this kind having a large bucket capacity and accordingly a high driving power for propulsion and for the hydraulic bucket operating system have been developed especially for underground operation in salt mines and ore mining operations. On account of the often very low height of the mine galleries and chambers, such underground loaders must be of extremely low construction, which makes it necessary to arrange the units in tandem, inasmuch as the width of the loader is also limited by space conditions. The loaders therefore are of great length, on the order of 9 meters and more. Loaders of this length cannot, as a rule, turn around in the working face area, and therefore they are so constructed that they are able to run in both directions of travel, i.e., forward and reverse, at full propulsion speed. Since the driver has approximately equal visibility in either direction of travel, the driver's station is situated on the rear car in the central part of the loader, i.e., in the immediate vicinity of the coupling, offset to one side of the longitudinal axis of the loader, with the driver facing transversely of the direction of travel. Thus, when shifting from forward to reverse travel, the driver needs only to turn his head about 90° from the direction he is facing. The driver's view, however, is limited in both directions of travel due to the great length of the loader, because the driver's seat is set so low that the driver can see only straight over the top of the loader. The extremely low, but consequently also greatly elongated construction makes it necessary, as a rule, to bring the loader into the pits piece by piece and assemble it there, and also to perform all maintenance and repair work on the loader underground, since bringing the loader to shops above ground would again make it necessary to take the loader apart.

THE INVENTION

The invention is addressed to the problem of constructing loaders of the kind described such that they can be taken apart very simply and quickly into individual components for assembly and disassembly purposes, and so that the motor and transmission assembly, which requires more frequent servicing, will be easily accessible for maintenance and repair purposes.

Setting out from a loader of the initially mentioned kind, this problem is solved by the invention in that the rear car is composed of a chassis fixedly attached to the rear axle, which has a stiff bulkhead serving for the mounting of the motor and transmission assembly, and that the motor and transmission assembly is disposed in a secondary frame having a bulkhead that can be fastened to the bulkhead of the chassis, from which longitudinal girders extend along both sides of the motor and transmission assembly, the motor and transmission assembly being mounted between them.

The entire motor and transmission assembly, therefore, can be removed together with the secondary frame after its bulkhead has been removed from the bulkhead of the chassis.

In an advantageous further development of the invention, the bulkhead of the chassis serving for the mounting of the secondary frame is disposed behind the rear axle of the rear car, and it has an opening for the longitudinal girders of the secondary frame and for the motor and transmission assembly which it carries, the longitudinal girders projecting forwardly in the direction of travel and rearwardly from the bulkhead of the secondary frame. It is recommendable to provide the opening approximately centrally in the bulkhead of the chassis and to make it open at the top, so that the bulkhead will have an approximately U-shaped configuration. The secondary frame, therefore, can be introduced into the opening in the bulkhead from above or, under restricted space conditions, it can be introduced horizontally into the chassis from the rear end of the loader.

The fastening of the bulkhead of the secondary frame to the bulkhead of the chassis is performed preferably by bolting together the bulkheads brought face to face with one another.

The secondary frame bulkhead which can be fastened to the chassis bulkhead is preferably also of a U-shaped configuration with the opening at the top, its width and height being smaller than the corresponding dimensions of the chassis bulkhead, and the portion of the secondary frame which projects rearwardly beyond the bulkhead, as well as the motor and transmission assembly carried by it, is shielded at the bottom by a sturdy bottom trough which is releasably fastened to the chassis bulkhead. For this purpose it is recommendable to provide the bottom trough with a bulkhead which can be fastened to the chassis bulkhead outside of the area of the bulkhead of the secondary frame, so that the bulkhead of the bottom trough is therefore fastened to the chassis bulkhead in the same plane as the bulkhead of the secondary frame, and virtually surrounds the bulkhead of the secondary frame. Basically, the bottom trough can also be mounted by bolting its bulkhead to the chassis bulkhead.

In a preferred embodiment of the invention, the bottom trough bulkhead, however, is provided in its lower area with two downwardly facing hooks spaced laterally apart, which can engage horizontal pins provided on the chassis. Furthermore, an eye lug is provided on the bottom trough bulkhead at a distance above each hook. The bottom trough can then be fastened to the chassis of the rear car such that the front end of the bottom trough beneath the rear part of the secondary frame is first lifted and its hooks are then guided over the horizontal pins and suspended on these pins. Then the rear end of the bottom trough is raised, by means of a lever or by a car jack, for example, swinging upwardly about the lower horizontal pins of the chassis, until the bulkhead of the bottom trough engages the chassis bulkhead. Then the pins mounted for transverse displacement on the chassis are pushed into the upper eyes of the bottom trough, thus completing the installation of the bottom trough.

The embodiment is at the same time preferably such that the chassis bulkhead has openings for the passage of the mounting hooks and eyes of the bottom trough, and that the pins engaging the eyes and hooks are disposed on the side of the transverse wall of the chassis which faces away from the bottom trough. The mounting hooks and eyes of the bottom trough thus pass through the openings in the chassis bulkhead when the bottom trough is fastened in place.

To facilitate the insertion of the upper pins into the bottom trough mounting eyes, it is furthermore recommendable to associate these pins with threaded spindles by whose rotation they can be driven into or extracted from the associated fastening eyes. These threaded spindles can extend all the way to the outside of the chassis, a square or hexagonal head being able to be provided on their outer ends, to which a crank or a ratchet handle can be attached. By means of the thread of the threaded spindle and the lever arm of the crank or ratchet handle, it will then be possible to drive the pins into the mounting eyes with relatively little expenditure of force, even if they fit tightly therein, and thus to fasten the bottom trough tightly to the chassis of the rear car. The removal of the bottom trough is just as easy, the pins first being drawn from the upper fastening eyes and then the rear end being lowered. The motor and transmission assembly will then be already sufficiently accessible for maintenance purposes, as a rule, so that the hooks can remain attached to the corresponding pins.

Furthermore, the bottom trough can serve simultaneously to hold the rear covering of the motor and transmission assembly, in which case it can also accommodate the reservoirs for the hydraulic fluid, if desired.

In an advantageous further development of the invention, the driver's station including the seat and all of the controls provided for the propulsion of the loader and for the operation of the hydraulic control system can be disposed on a platform mounted resiliently in the vertical direction as a unit on the chassis. The driver's station can thus be installed and removed as a unit with all of its equipment. Since this unit is spring mounted as a whole on the chassis, the driver is protected against shocks due to uneveness of the floor. In the known loaders, attempts have been made to isolate the driver from shocks by mounting the driver's seat resiliently in the driver's station which otherwise is rigidly affixed to the chassis of the loader, relatively great spring excursions being provided for the seat. This means, however, that the driver's seat bounces up and down when the machine encounters a pothole, for example, causing the driver's angle of view to change relative to the instruments. On this account, and because the driver's feet have to rest on the unsprung floor and the driver has to grip the likewise unsprung steering wheel, his fatigue with the conventional rigid arrangement of the driver's station is considerably greater than in the case of the embodiment of the invention.

The driver's station can be guided by rollers for upward and downward displacement on vertical guide rails in the chassis. Alternatively, the driver's station can also be mounted for vertical displacement in the chassis by means of link levers articulated to the chassis at one end and to the driver's station on the other.

The resilient supporting of the driver's station on the chassis is achieved preferably by means of a compression spring disposed between the platform carrying the driver's station and the chassis.

In an advantageous further development of the invention, this compression spring is in the form of a gas spring, whereby it is possible to connect a conduit provided with a valve means to the pressure chamber of the gas spring, whereby the gas pressure can be varied.

Thus it is not only possible to adapt the stiffness of the spring to different weights of the driver's station, but also to vary to a certain extent the height of the driver's station platform above the supporting surface of the chassis, so that it is possible, for example, to raise the driver's station relative to the chassis when this is possible due to the conditions prevailing with regard to space in the particular mining operation. In such cases, the driver's view can thus be improved by raising the entire driver's station.

Another advantage of the integral springing of the driver's station is to be seen in the fact that a cab that might be installed on the driver's station can be made lower since no additional space has to be made available for the oscillation of a sprung seat.

To prevent continued oscillation of the driver's station after driving over a pothole, it is furthermore desirable to provide at least one shock damper, preferably a hydraulic shock damper, articulately connected between the driver's station on the one hand and the chassis on the other.

The invention will be further explained in the following description of an embodiment in conjunction with the drawing, wherein:

FIGS. 1 and 2 are a side elevation and a top view, respectively, of a bucket loader constructed in the manner of the invention;

FIG. 3 is a side elevational view on a larger scale than in FIG. 1 of the rear car of the loader of the invention, wherein the arrangement of the motor and transmission assembly on the bulkhead of the chassis is represented by solid lines, while the rest of the chassis, the bottom trough and the covering of the motor and transmission unit is indicated by dash-dotted lines;

Figure 4:
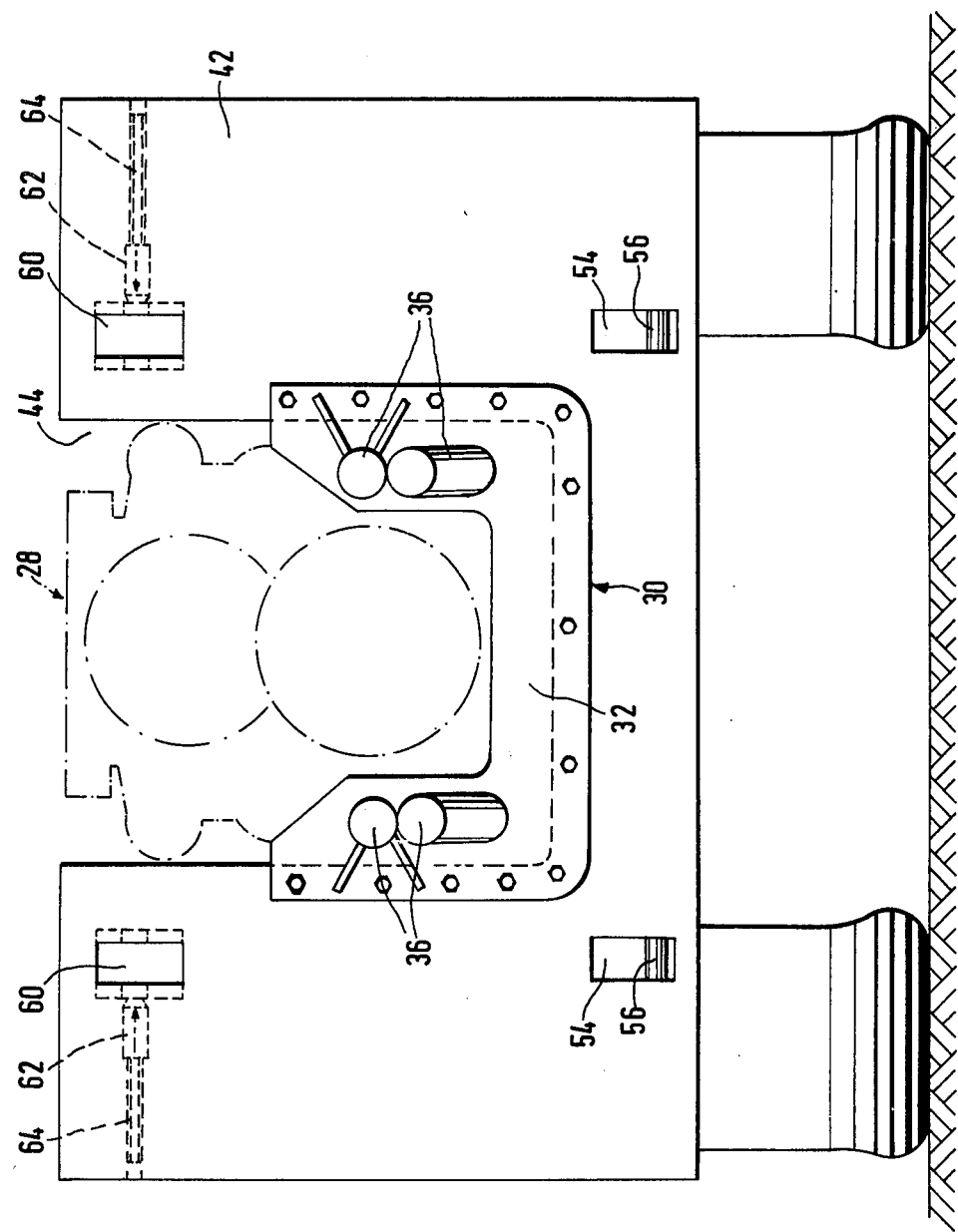
FIG. 4 is a rear elevational view of bulkhead wall of the chassis with the secondary frame inserted, as seen in the direction of arrow 4 in FIG. 3.

FIGS. 1 and 2 show a loader in accordance with the invention, designated as a whole by the number 10. This is a bucket loader for underground use in salt mines or ore mines. The loader 10 consists basically of two principal parts, namely a single-axle front car 12 and a likewise single-axle rear car 14, which are joined together by a hinge coupling 16 which permits the loader 10 to be steered by turning the front car 12 relative to the rear car 14. The turning of the front car 12 relative to the rear car is brought about by hydraulic steering cylinders connected at one end to the front car 12 and to the rear car 14 at the other, adjacent the hinge coupling 16.

The bucket 20 for picking up materials is pivotally attached to the front end of a boom 18 mounted on the frame of the front car 12 so as to be able to pivot vertically. A linkage connected to the bucket permits the bucket to be rotated in any of the positions of the boom 18. Both the raising and the lowering of boom 18, as well as the up-turning and dumping of the bucket 20, are accomplished by means of a hydraulic system of which only two hydraulic piston and cylinder units 22 are indicated diagrammatically in FIG. 1.

On the other hand, all of the units required for the propulsion of the loader and the delivery and control of the hydraulic fluid for the working and steering hydraulic systems are provided in the rear car 14 along with the driver's station 24. To provide the driver with approximately equal visibility when driving both forward and in reverse, the driver's station 24 is disposed at the front end of the rear car 14, i.e., approximately in the middle area of the loader 10, within its chassis 26 which is made from heavy steel plate and is fixedly set upon or stiffly joined the rear axle 15, and it is set to one side of the loader with the seat facing transversely of the direction of travel. The rear axle of the loader is driven, like the front axle, by a motor and transmission assembly disposed in the rear portion of the rear car 14, which consists, as a rule, of a diesel engine on which a transmission provided with a hydraulic torque converter is flange-mounted. The hydraulic pump unit serving to supply hydraulic fluid to the working and steering hydraulic systems is also driven directly by this diesel engine, as a rule. To the extent described up to this point, the design of the loader 10 is known.

New, however, is the disposition of the motor and transmission assembly 28 in accordance with the invention, shown in FIGS. 3 and 4, in a secondary frame 30, which consists of a bulkhead of U-shaped configuration, cut from heavy steel plate, and of the longitudinal girders 34 and 36 projecting forward and rearward from both limbs of the U, which are formed in this case of pairs of tubes welded to the bulkhead 32. The motor and transmission assembly 28 disposed between the longitudinal girders 34 and 36 is mounted on the longitudinal girders at 38 and 40, respectively, in the rearward end area. The secondary frame 30 is bolted, in the manner represented in FIG. 4, to a bulkhead 42 of chassis 26, which is cut from heavy steel plate, the chassis bulkhead having a central cutout 44 open at the top, i.e., being of a U-shaped configuration. The cutout 44 is of such a size that the longitudinal girders 34 and 36 of the secondary frame 30 can pass through it, while the outer margin of the bulkhead 32 just overlaps the inner margins of the chassis bulkhead 42, so that it is possible to bolt the two bulkheads together.

The portion of the motor and transmission unit 28 that is behind the bulkhead 32 of chassis 26 is protected on the bottom by a heavy bottom trough 46 welded from steel plate, with raised sides, which also carries the hood 48 covering the top of the motor and transmission unit, and preferably also carries the reservoirs (not shown) for the hydraulic fluid. The bottom trough 46 has also on the chassis side a heavy bulkhead 50 of U-shaped configuration, whose cutout, however, is larger than the outside dimensions of the bulkhead 32 of the secondary frame 30, so that it can thus be fastened to the chassis bulkhead 42 in the area outside of the area covered by the secondary frame bulkhead but in the same plane therewith. Fundamentally, this fastening could be accomplished the same as the fastening of the secondary frame 32 by bolting its bulkhead 50 to the chassis bulkhead wall 42, but in the case illustrated a fastening method is selected which makes possible a quicker and easier assembly and disassembly.

At the lower area of the bulkhead 50 two heavy hooks 52 opening downwardly are welded, which can pass through openings 54 of the chassis bulkhead 42 and can engage pins 56 which have their axes in line horizontally and are fastened on the forward side of the bulkhead 42 to the chassis 26, preferably to the bulkhead 42 itself.

At a distance above each hook 52 there is welded to the transverse wall 50 of the floor trough a mounting eye 58. These bulkhead 58 can be bottom through openings 60 in the chassis bulkhead 42, and then pins 62 can be introduced transversely through the eyes 60 to lock the bulkhead 50 tightly against the chassis bulkhead 42. The pins 62 are preferably designed so as to be driven positively by threaded spindles 64, so that, when the spindles are turned—for example by means of cranks or ratchet handles attached to their extremities—they can be driven into and out of the locking position. In FIG. 3 the bottom trough (represented in broken lines) is shown on the one hand in the position in which it is fastened to the chassis bulkhead 42, and on the other hand in a position wherein only the hooks 52 engage the pins 56, while the rear end of the bottom trough 46 rests on the floor, and it can be seen that in this position the bottom trough makes the motor and transmission assembly largely accessible for maintenance and repairs. For such purposes, therefore, it will as a rule suffice for the pins 62 to be extracted from the eyes 58 and for the floor trough 46 to be lowered in the manner shown. Only when still better accessibility of the motor and transmission assembly 28 is desired will the hooks 52 also be disengaged from the pins 56, and then the entire loader 10 will be rolled forward away from the bottom trough 46 which will then be lying on the floor.

Figure 5:
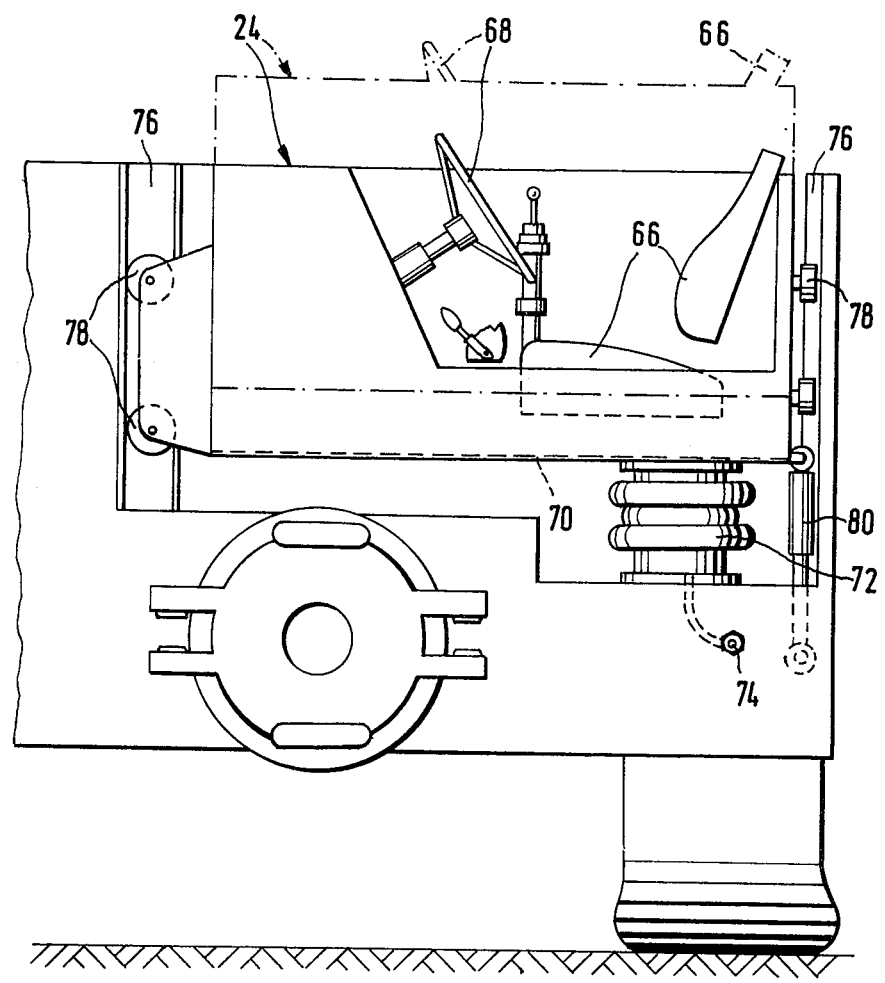
FIG. 5 is a side view of the driver's station of the loader of the invention, as seen in the direction of the arrows 5—5 in FIG. 1.

In FIG. 5, the driver's station 24 is shown as seen from the front, it being apparent that the entire driver's station including the seat 66, the steering wheel 68 and all the rest of the operating and control devices for the propulsion of the loader and for the operation of the bucket are installed on a platform 70 which is carried for vertical displacement in a chassis 26 and is supported resiliently against the chassis 26. The springing in the illustrated case is provided by means of an air spring 72 which can be filled with compressed air through an external valve 74. By varying the pressure in the air springs, not only the stiffness of the springs but also the elevation of the driver's station is to a certain extent variable, this being indicated in the drawing where the driver's station 24 is shown in solid lines in the normal position and in dash-dotted lines in a raised position which is established whenever the amount of space available at the worksite permits it.

The driver's station 24 is carried for vertical displacement on rollers 78 provided on the station and guided by vertical guide rails 76 on chassis 26. It is clear that, instead of such roller guidance, other kinds of guidance of the driver's station are possible, such as parallelogram guides or the like.

A hydraulic shock damper 80 attached at one end to the driver's station and at the other end to the chassis 26 prevents the continued vibration of the driver's station 24 after the loader passes over a bump.

The invention is described above in conjunction with an underground bucket loader, the embodiment of the invention relating exclusively to the rear car, i.e., that part of the loader which contains the motor and the driver's station. The invention, therefore, is not limited to the bucket loader described, but can also be applied to those loaders in which the front car is formed, for example, by a dragline or a bottom dumping bucket.

I claim:

1. A loader, especially a bucket loader for underground use in mining operations, comprising a rear car carrying a propulsion unit including a hydraulic pump, a driver's station and having a rear axle, a front car, a hinge joint coupling the front car to the rear car, said front car carrying a bucket and a hydraulic system for operating said bucket, a motor and transmission assembly, said rear car being formed by a chassis stiffly joined to said rear axle, said chassis having a first bulkhead for mounting the motor and transmission assembly thereon, said first bulkhead being disposed behind said rear axle and having a cutout provided approximately centrally in said first bulkhead and open at the top, so that said first bulkhead is approximately U-shaped, said motor and transmission assembly being disposed on a secondary frame which has a second bulkhead adapted to be fastened to said first bulkhead, said second bulkhead having a U-shaped configuration with a cutout open at the top, longitudinal girders projecting from said second bulkhead from within said cutout of said first bulkhead on both sides of said motor and transmission assembly forwardly and rearwardly in the longitudinal direction of said loader, said motor and transmission assembly being mounted between said girders, and a sturdy bottom trough covering that portion of said secondary frame which extends rearwardly beyond said second bulkhead and said motor and transmission assembly carried thereby, said bottom trough being releasably fastened to said first bulkhead.

2. A loader according to claim 1, wherein said first and second bulkheads are bolted together face to face at areas where they engage and overlap.

3. A loader according to claim 1, wherein said bottom trough has a third bulkhead which is adapted to be fastened to and in contact with said first bulkhead outside of the area of said second bulkhead.

4. A loader according to claim 3, wherein said third bulkhead has a lower area having two hooks open downwardly and having a lateral distance between them, a plurality of bolts on said chassis horizontal said hooks being adapted to be suspended on said bolts, and wherein at a distance above each hook a mounting eye is provided on said third bulkhead, into which pins mounted for transverse displacement on said chassis, at the proper fastening position of said bottom trough, are adapted to be inserted.

5. A loader according to claim 4, wherein said first bulkhead has openings for the passage of said hooks and mounting eyes of said bottom trough, and wherein said bolts and pins engaging said hooks and mounting eyes are disposed on that side of said first bulkhead which is opposite said bottom trough.

6. A loader according to claim 4 or 5, comprising threaded spindles, and wherein said pins mounted for transverse displacement on the chassis are associated with said threaded spindles, rotation of said spindles in opposite directions respectively inserting said pins into and removing said pins from their associated mounting eyes.

7. A loader according to claim 1, wherein said driver's station includes a seat and control and supervision apparatus provided for the propulsion of the loader and for the operation of said hydraulic system is disposed on a platform, and comprising means for guiding said platform vertically as a whole on the chassis and for resiliently supporting the same thereon.

8. A loader according to claim 7, wherein said means comprises rollers for guiding said station displaceably in the vertical direction on the chassis, said rollers being guided in vertical guide rails.

9. A loader according to any one of claims 7 or 8, comprising a compression spring disposed between said chassis and said platform carrying the driver's station.

10. A loader according to claim 9, wherein said compression spring is a gas spring.

11. A loader according to claim 10, wherein said gas spring comprises a pressure chamber and wherein a closable conduit is connected to said pressure chamber, through which the gas pressure in said spring can be varied.

12. A loader according to any one of claims 7, 8, 10 or 11, comprising at least one shock absorber which is articulated to the driver's station at one end and to said chassis at the other end.

* * * * *